United States Patent [19]

O'Brien

[11] 4,185,781
[45] Jan. 29, 1980

[54] QUICK-DISCONNECT NOZZLE CONNECTION

[75] Inventor: Edward J. O'Brien, Barrington, Ill.
[73] Assignee: Spraying Systems Co., Wheaton, Ill.
[21] Appl. No.: 869,421
[22] Filed: Jan. 16, 1978
[51] Int. Cl.² .............................................. B05B 1/02
[52] U.S. Cl. .................................... 239/600; 285/376
[58] Field of Search ............... 239/550, 600; 285/375, 285/376, 401

[56] References Cited

U.S. PATENT DOCUMENTS

| 1,130,726 | 3/1915 | Greve | 285/376 |
| 1,177,884 | 4/1916 | Molesta et al. | 239/600 X |
| 3,370,144 | 2/1968 | Arthur et al. | 285/376 X |

FOREIGN PATENT DOCUMENTS

| 255921 | 4/1963 | Australia | 285/376 |
| 545332 | 10/1922 | France | 285/375 |
| 1487141 | 5/1967 | France | 239/600 |

*Primary Examiner*—Robert B. Reeves
*Assistant Examiner*—Andres Kashnikow
*Attorney, Agent, or Firm*—McWilliams, Mann & Zummer

[57] ABSTRACT

A quick-disconnect nozzle connection for a spraying tip and a nozzle body. The spraying tip is defined by a cylindrical inlet stem at one end of the tip, an interior fluid passage communicating from the inlet of the cylindrical stem through the tip to an orifice, at least one arcuate section extending radially outwardly from the cylindrical surface of the stem, and a recess formed in each arcuate section. The nozzle body is adapted to be connected to a source of fluid and defines an interior fluid passage, a first cylindrical chamber adapted to receive the cylindrical stem of the spraying tip, a second cylindrical chamber of larger diameter than the first cylindrical chamber and in axial alignment with the first chamber and further adapted to receive each arcuate section of the spraying tip, and retention segments extending radially inwardly over the second chamber, each of the retention segments adapted to matingly engage a corresponding recess in an arcuate section to connect the spraying tip and nozzle body in a locked and precise angular relationship. A spring disposed between the nozzle body and spraying tip maintains the body and tip in the locked relationship. Methods of manufacture for the tip and body are also disclosed.

1 Claim, 5 Drawing Figures

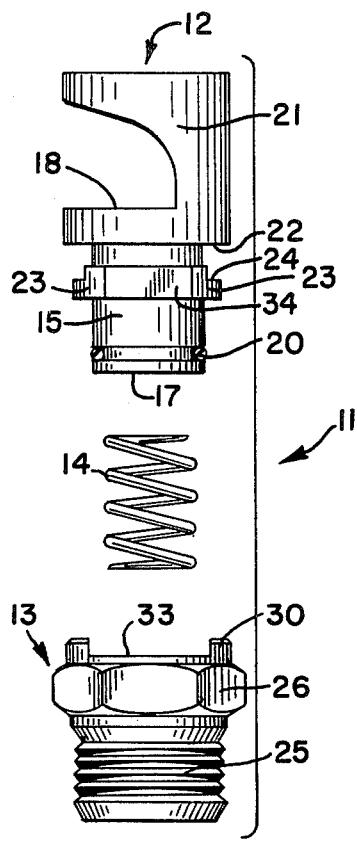
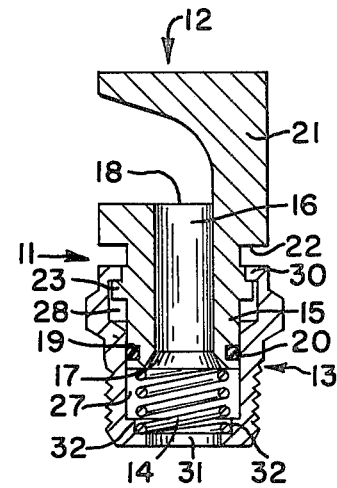
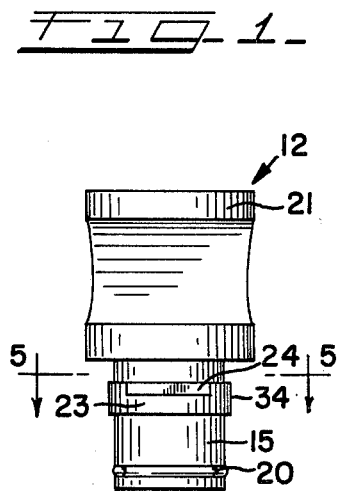
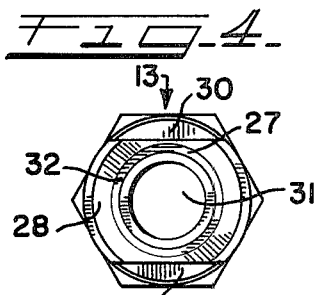
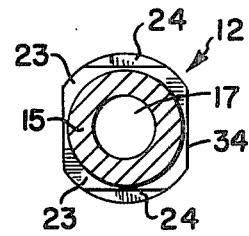

QUICK-DISCONNECT NOZZLE CONNECTION

BACKGROUND OF THE INVENTION

This invention relates in general to a quick-disconnect nozzle connection between a nozzle body and a spraying tip, and more particularly to such a connection which provides precise angular orientation of the spraying tip.

It is frequently desirable to remove or change a spraying nozzle for a variety of reasons. Inspection of the nozzle tip may be required for clogging or other stopage. The nozzle tip may be replaced with a different type for different spraying operations. It may be desirable to orient the spray in a different direction. Other reasons will be readily apparent to those skilled in the art.

The common threaded connection of a spraying nozzle to spraying apparatus has significant limitations. Where a non-axial direction of spray is utilized, the threaded connection required adjustment of the direction each time the nozzle is removed. Much spraying apparatus is not stationary which requires that tools must be provided at the various sites where the apparatus is used, or otherwise carried with the apparatus. Removing a threaded nozzle is also time consuming, particulary where the spraying apparatus has multiple nozzles.

Some quick disconnect nozzle arrangements have been proposed. Additional parts, besides the nozzle body and spraying tip, are frequently required to couple or join the tip to the body. Such coupling components can result in a significant loss of time if the same are lost or misplaced during disassembly of the nozzle. This problem becomes particularly acute for mobile spraying apparatus. Other quick disconnect nozzle arrangements rely upon frictional engagement of the tip to the body. Precise machining or molding tolerances are required in these instances. Frictional engagement is also undesirable for non-axial spraying directions since the spraying tip must be adjusted to the appropriate direction each time the nozzle is disassembled.

Many of the prior art quick disconnect arrangements do not provide good immunity from the effects of vibration or pressure surges which are encountered in many spraying systems.

SUMMARY OF THE INVENTION

The quick-disconnect nozzle connection of the present invention utilizes a nozzle body adapted for permanent or semi-permanent connection to a source of fluid from a spraying system, such as a pipe or conduit thereof. The nozzle body is generally cylindrical in shape with a fluid passage defined therein generally along an axis of said body. A first cylindrical chamber is provided in the interior of the body and in generally axial alignment therewith. A second cylindrical chamber of generally larger diameter than said first chamber is also provided in the interior of said body and in axial alignment with said first chamber. Retention means in the form of radially inwardly projecting segments overlie a portion of a slotted opening to said second chamber.

A spraying tip is provided with a generally cylindrical inlet stem at one end of the tip with an interior fluid passage communicating from one end of the cylindrical stem through the tip to an orifice in said tip. Locking means, in the form of at least one arcuate section extending radially outwardly from the cylindrical surface of said stem and a recess formed in each arcuate section, is disposed at an intermediate point between the ends of the stem. An enlarged spray head portion of generally cylindrical configuration, but of larger diameter than said cylindrical stem, may be provided near the orifice end of the spraying tip. An annular groove may also be provided near the inlet end of the cylindrical stem for insertion therein of an O-ring or other sealing means.

The spraying tip is inserted into the nozzle body with the cylindrical stem inserted into the first cylindrical chamber with the arcuate section rotated such that the arcuate section passes by the retention means extending over the second cylindrical chamber. When fully inserted, the arcuate section will be fully within the second cylindrical chamber and a bottom surface of the enlarged spray head portion of the nozzle tip will stop against the retention means of the nozzle body. The spraying tip may then be rotated within the nozzle body to align the retention means with a corresponding recess in the arcuate section.

Resilient means, generally in the form of a coil spring, is disposed between the nozzle body and the inlet end of the spraying tip. Upon release of the spraying tip, a retention means of the nozzle body lies in a corresponding recess in each arcuate section formed on the cylindrical stem of the nozzle tip, thereby locking the spraying tip in an operating position relative to the nozzle body. The spraying tip is now precisely oriented in an angular relationship with respect to said body and the spraying tip may be easily and quickly removed or replaced without disturbing this angular relationship and without the need for any tools.

The nozzle body can be quite easily and simply manufactured from a common reduction fitting by longitudinally boring the first cylindrical chamber therein, milling a second cylindrical chamber of larger diameter therein and by milling a transverse slot across the top of the fitting, thereby leaving segments of material, i.e. the retention means, overlying the opening to said second cylindrical chamber. The spraying tip may be easily manufactured by any of a variety of molding or casting processes. Other objects, features and advantages of the invention will become apparent from the following detailed disclosure when taken in conjunction with the drawings.

BRIEF DESCRIPTION OF THE DRAWINGS

In the drawings:

FIG. 1 is an exploded elevational view of the quick-disconnect nozzle;

FIG. 2 is an elevational sectioned view of FIG. 1 with the spraying tip inserted into the nozzle body and in locked relationship therewith;

FIG. 3 is a front elevational view of the spraying tip of FIG. 1;

FIG. 4 is a top plan view of the nozzle body illustrated in FIG. 1; and

FIG. 5 is a sectional view along sectional line 5—5 of FIG. 3, illustrating the arcurate sections and recesses along the cylindrical stem of the spraying tip.

DESCRIPTION OF THE PREFERRED EMBODIMENT

Turning to FIG. 1, a quick disconnect nozzle, generally designated 11, is illustrated in exploded elevational view. The nozzle 11 is comprised of a spraying tip, generally designated 12, a nozzle body, generally designated 13, and a spring 14 disposed therebetween. The significance of the structural features of the spraying tip 12 and the nozzle body 13 will become more apparent at a later point.

A spraying tip 12 has a cylindrical inlet stem 15 at one end thereof. As illustrated in FIG. 2, an interior fluid passage 16 is defined in the cylindrical stem 15 between an inlet end 17 of the spraying tip 12 to an orifice 18 thereof. A circumferential groove 19 may be provided about the cylindrical stem 15 near the inlet end 17 for insertion therein of an O-ring 20, or other suitable sealing means.

An enlarged spray head portion 21, of generally cylindrical configuration, at the orifice 18 end of the spraying tip 12 is particularly suitable for applications which require spray patterns in a non-axial direction to the axis of the cylindrical stem 15. However, it will be appreciated that the quick disconnect connection of the present invention is applicable to nozzle tips employing both axial and non-axial spray patterns. The spray head portion 21 is preferably of larger diameter than the stem 15 to provide a bottom surface 22, the significance of which will be appreciated later. The enlarged head portion 21 also makes it easier to depress the spraying tip 12 into the nozzle body 13 against the resilient pressure of the spring 14.

Locking means, exemplified by a pair of arcuate sections 23, extend radially outwardly from the cylindrical surface of the stem 15 at a point intermediate the inlet end 17 of the stem 15 and the bottom surface 22 of the spray head portion 21. The arcuate sections 23 extend outwardly from the stem 15 at approximately opposite diametric positions (FIG. 5). The area between the arcuate sections 23 along the stem 15 are relatively free of material extending outwardly from the stem 15, and may be flat as in FIG. 5. Each of the arcuate sections 23 is provided with a recess 24 in the side of the arcuate section 23 which faces the bottom surface 22 of the spray head portion 21.

The nozzle body 13 is adapted, as by threads 25, to be connected to a source of fluid from a spraying system, such as a pipe, conduit or the like (not shown). The body 13 may also be provided with a hexagonal portion 26 around the outer periphery thereof to aid in installing the body 13 with conventional tools. The body 13 is otherwise of generally cylindrical configuration. According to one aspect of the invention, the interior of the body 13 is specially designed and constructed to join, communicate and otherwise operationally cooperate with the spraying tip 12. Turning to FIGS. 2 and 4, it will be seen that the body 13 has a first cylindrical chamber 27 extending longitudinally through a substantial portion of the body 13, and generally in axial alignment therewith. A second cylindrical chamber 28 is also defined in the interior of said body 13. The second chamber 28 is of larger diametric dimension than the first chamber 27 and is located near the top opening of the body 13. The chambers 27, 28 are in axial alignment.

A pair of oppositely disposed retention means 30 project radially inwardly over a portion of the second cylindrical chamber 28 near the top end of the body 13. Except for that portion of the second cylindrical chamber 28 over which the retention means 30 project, communication of the second cylindrical chamber 28 with the top end of the body 13 is unobstructed. An aperture 31 at the bottom end of the body 13, in conjunction with the chambers 27, 28, defines a fluid passage through the body 13. Preferably, the aperture 31 is of smaller diameter than the first chamber 27, thereby providing a seat for one end of the spring 14. It is also preferable that the interior cylindrical wall of the body 13 be provided with small inward projections 32 between the first cylindrical chamber 27 and the aperture 31 and of approximately the same diameter as the outside diameter of the spring 14 such that one end of the spring 14 will be frictionally secured between the projections 32 to prevent loss or the like of spring 14. The remainder of the spring 14 freely operates in the first chamber 27 to exert resilient pressure against the spraying tip 12 near the inlet 17 thereof.

Having examined the various structural features of the quick disconnect nozzle 11, the operational significance of these features will now be considered. The spraying tip 12 is insertable into the nozzle 13 by first rotating the tip 12 relative to the body 13 such that the arcuate sections 23 will pass through a transverse slot 33 defined between retention means 30 disposed on either side of the top of the body 13. Flat areas 34 between the arcuate sections 23 will then pass by the retention segments 30 of the body 13. When the tip 12 is fully depressed into the body 13, the lower portion of the cylindrical stem 15 will be received by the first cylindrical chamber 27, the arcuate sections 23 will be received by the second cylindrical chamber 28, and the bottom surface 22 of the spray head portion 21 will come to stop against the top surface of the retention segments 30. At this point, the tip 12 may be freely rotated within the body 13 for alignment of the recesses 24 in the arcuate sections 23 with the retention segments 30. Upon release of the tip 12, the resilient force of the spring 14 will move the tip 12 upwardly, thereby locking the retention segments 30 in the recesses 24. The tip 12 is now in precise angular relationship with respect to the body 13 and cannot be displaced from this angular relationship without again depressing the tip 12 in the body 13 to free the retention segments 30 from the recesses 24.

While the preferred embodiment has been presented above and shown in the figures, it will become apparent to those skilled in the art that various modifications and changes may be made. For instance, the preferred embodiment has a pair of oppositely disposed retention segments 30 and corresponding arcuate sections 23 with recesses 24. In this embodiment, a non-axial spray head such as that illustrated in the figures may be oriented in either of two opposite directions. If the body 13 is provided with a single retention segment and the tip 12 with a single arcuate section 23 and recess 24, the tip 12 would be installable in the body 13 in only one direction. Similarly, the tip 12 and body 13 could be provided with more than two respective arcuate sections 23 and retention segments 30 such that the tip 12 could operate at a corresponding number of angular positions relative to the body 13.

The foregoing structural arrangement of the spraying tip 12 and the nozzle body 13 further permits simple, efficient and economic methods of fabricating the same. The body 13 is preferably manufactured by providing a suitable material for machining operations. Brass, bronze or aluminum are illustrative examples. Manufacture of the body 13 can be readily accomplished by machine operations on a common reduction fitting, which is used to connect different diameters of pipe. A first cylindrical chamber 27 is longitudinally bored into said body 13 to a depth which leaves material remaining in the form of protections 32 (FIG. 2). The boring of the first chamber 27 is preferrably in general axial alignment with the body 13. A second cylindrical chamber 28 of larger diameter than said first chamber 27 is then milled into said body near a top end thereof with the chambers 27, 28 in generally axial alignment. A diametric transverse slot 33 (FIG. 1) is then milled across the top of the body 13, thereby leaving a pair of oppositely disposed retention segments 30 which project radially inwardly over a portion of the second chamber 28.

The spraying tip 12 may be manufactured from a wide variety of plastic materials by injection molding techniques or from metallic materials by casting or machining processes.

It will be appreciated by those skilled in the art that the selection of materials for the tip 12 and body 13 will often times depend upon many factors. For instance, if corrosive fluids are being sprayed, it may be desirable to choose a material other than aluminum for the body 13. If hot fluids are being sprayed, care must be taken with the type of plastic material used for the tip 12, or the use of a metallic material may be required.

While a particular embodiment of this invention has been shown and described, it is not intended to limit the same to details of the construction set forth, but instead, the invention embraces such changes, modifications and equivalents of the various parts in their relationships as come within the purview of the appended claims.

I claim:

1. A quick disconnect nozzle comprising a spraying tip having a cylindrical inlet stem at one end of said tip, an enlarged spray head formed on the other end of said tip including a deflector portion adapted to deflect spray in a direction substantially perpendicular to the axis defined by said cylindrical stem, said spray head of generally larger diametric dimension than said stem including a bottom surface defining stop means for said spraying tip when said stem is inserted into a nozzle body and an interior fluid passage communicating from one end of said stem through said tip to said spray head;

locking means disposed on said stem comprising a pair of arcuate sections extending radially outwardly from the surface of said stem and a recess formed in each arcuate section;

a nozzle body adapted to be connected to a source of fluid including an interior fluid passage defined therein, a first chamber adapted to receive said stem of said spraying tip, a second chamber adapted to receive the arcuate sections of said locking means for rotation therein, and a pair of opposed retention means extending radially inwardly along a diameter of said second chamber adapted to engage corresponding recesses in said arcuate sections of said locking means, said arcuate sections insertable past said opposite retention means into said second chamber when oriented in one position and fully rotatable in said second chamber when said stem is fully inserted into said first chamber to a position at which said recesses in each of said arcuate sections matingly engage one of said pair of retention means upon release of said spraying tip;

resilient biasing means disposed between said spraying tip and said nozzle body to urge said tip and body away from each other for retaining said tip and said body in a locked and precise angular relationship; and, sealing means disposed between the cylindrical stem of said spraying tip and said first chamber of said nozzle body to prevent fluid leakage between said tip and body.

* * * * *